US012650997B1

(12) United States Patent
Khachatryan et al.

(10) Patent No.: US 12,650,997 B1
(45) Date of Patent: Jun. 9, 2026

(54) ENHANCED RANKING AND RETRIEVAL OF DOCUMENTS AND INFORMATION BY UTILIZING AN IMPROVED RETRIEVAL-AUGMENTED GENERATION (RAG) SYSTEM

(71) Applicant: VARONIS SYSTEMS, INC., New York, NY (US)

(72) Inventors: Edward Khachatryan, Holon (IL); Amit Osi, Tel Aviv (IL)

( * ) Notice: Subject to any disclaimer, the term of this patent is extended or adjusted under 35 U.S.C. 154(b) by 0 days.

(21) Appl. No.: 19/017,658

(22) Filed: Jan. 12, 2025

(51) Int. Cl.
| | |
|---|---|
| *G06F 17/00* | (2019.01) |
| *G06F 7/00* | (2006.01) |
| *G06F 16/2457* | (2019.01) |
| *G06F 40/30* | (2020.01) |

(52) U.S. Cl.
CPC ........ *G06F 16/24578* (2019.01); *G06F 40/30* (2020.01)

(58) Field of Classification Search
CPC ........................... G06F 16/24578; G06F 40/30
USPC ........................................................ 707/748
See application file for complete search history.

(56) References Cited

U.S. PATENT DOCUMENTS

| | | | | |
|---|---|---|---|---|
| 12,099,802 | B1 * | 9/2024 | Petrauskas | .............. G06F 40/30 |
| 2022/0343903 | A1 * | 10/2022 | Mostafazadeh | ....... G06F 3/0481 |
| 2023/0359441 | A1 * | 11/2023 | Duan | ..................... G06N 3/084 |
| 2024/0012842 | A1 * | 1/2024 | Kislal | ................. G06F 16/3347 |
| 2024/0346256 | A1 * | 10/2024 | Qin | ....................... G06F 40/216 |

* cited by examiner

*Primary Examiner* — Pavan Mamillapalli
(74) *Attorney, Agent, or Firm* — AlphaPatent Associates Ltd.; Daniel J. Swirsky

(57) ABSTRACT

Enhanced ranking and retrieval of documents and information, utilizing improved Retrieval-Augmented Generation (RAG). A method includes: (a) collecting historical query-document data from past interactions of users with a RAG system; (b) defining relevance criteria that determine whether a document that was retrieved by via RAG is relevant to a query posed to the RAG system; (c) labeling query-document pairs with a binary relevance indicator of Relevant or Irrelevant; (d) encoding queries and documents into numerical embedding vectors using a pre-trained embedding model; (e) generating feature vectors by performing element-wise multiplication of corresponding components of query embeddings and document embeddings; (f) organizing the feature vectors into a structured dataset, and splitting it into a training subset and a validation subset; (g) training a logistic regression Machine Learning (ML) model using to predict the relevance of query-document pairs, and validating the model; (h) integrating the ML model into the RAG system for real-time relevance scoring of documents that the RAG system retrieves in response to new user queries.

20 Claims, 4 Drawing Sheets

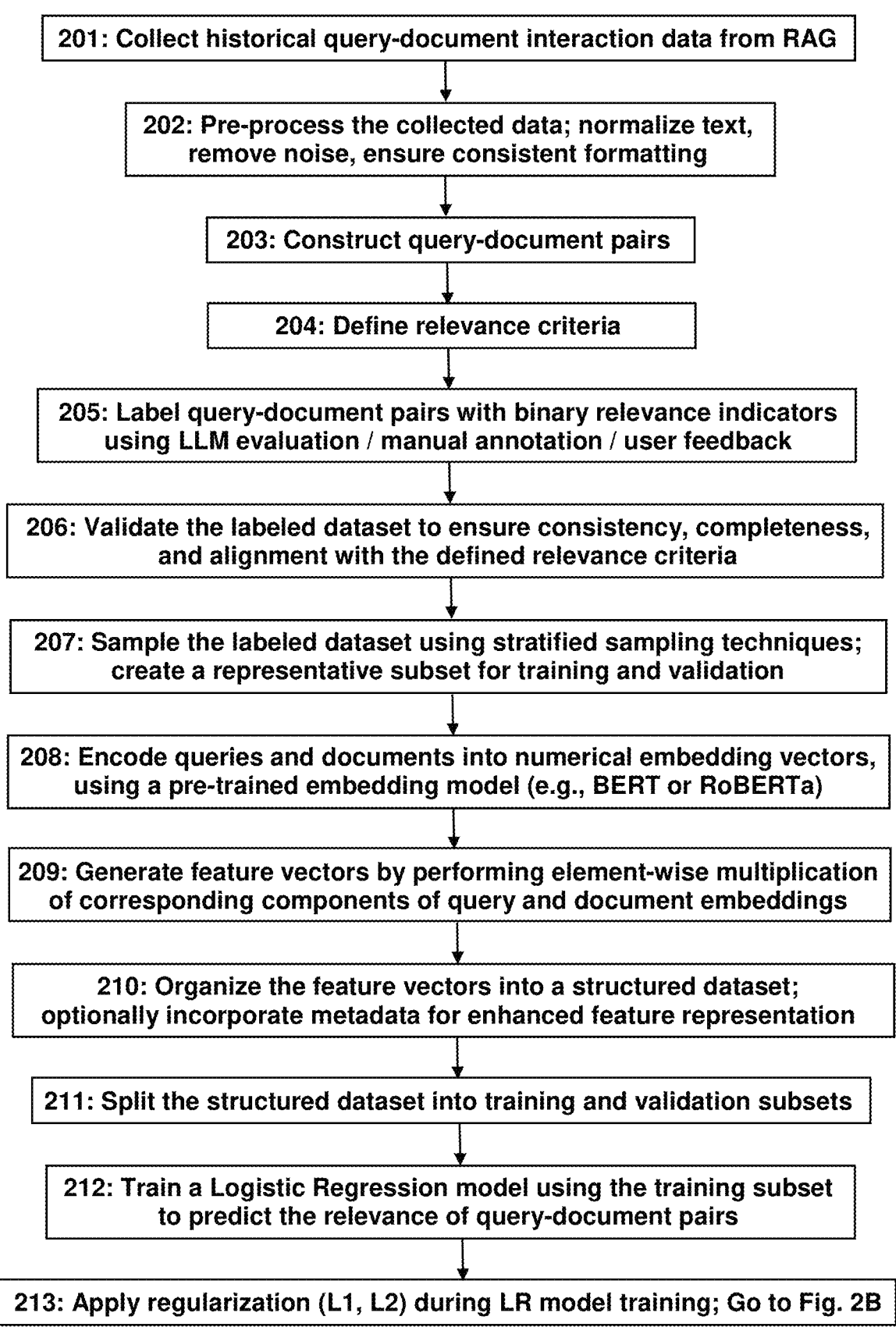

201: Collect historical query-document interaction data from RAG

202: Pre-process the collected data; normalize text, remove noise, ensure consistent formatting 203: Construct query-document pairs 204: Define relevance criteria 205: Label query-document pairs with binary relevance indicators using LLM evaluation / manual annotation / user feedback 206: Validate the labeled dataset to ensure consistency, completeness, and alignment with the defined relevance criteria 207: Sample the labeled dataset using stratified sampling techniques; create a representative subset for training and validation 208: Encode queries and documents into numerical embedding vectors, using a pre-trained embedding model (e.g., BERT or RoBERTa)

209: Generate feature vectors by performing element-wise multiplication of corresponding components of query and document embeddings 210: Organize the feature vectors into a structured dataset; optionally incorporate metadata for enhanced feature representation 211: Split the structured dataset into training and validation subsets 212: Train a Logistic Regression model using the training subset to predict the relevance of query-document pairs 213: Apply regularization (L1, L2) during LR model training; Go to Fig. 2B

*Fig. 2A*

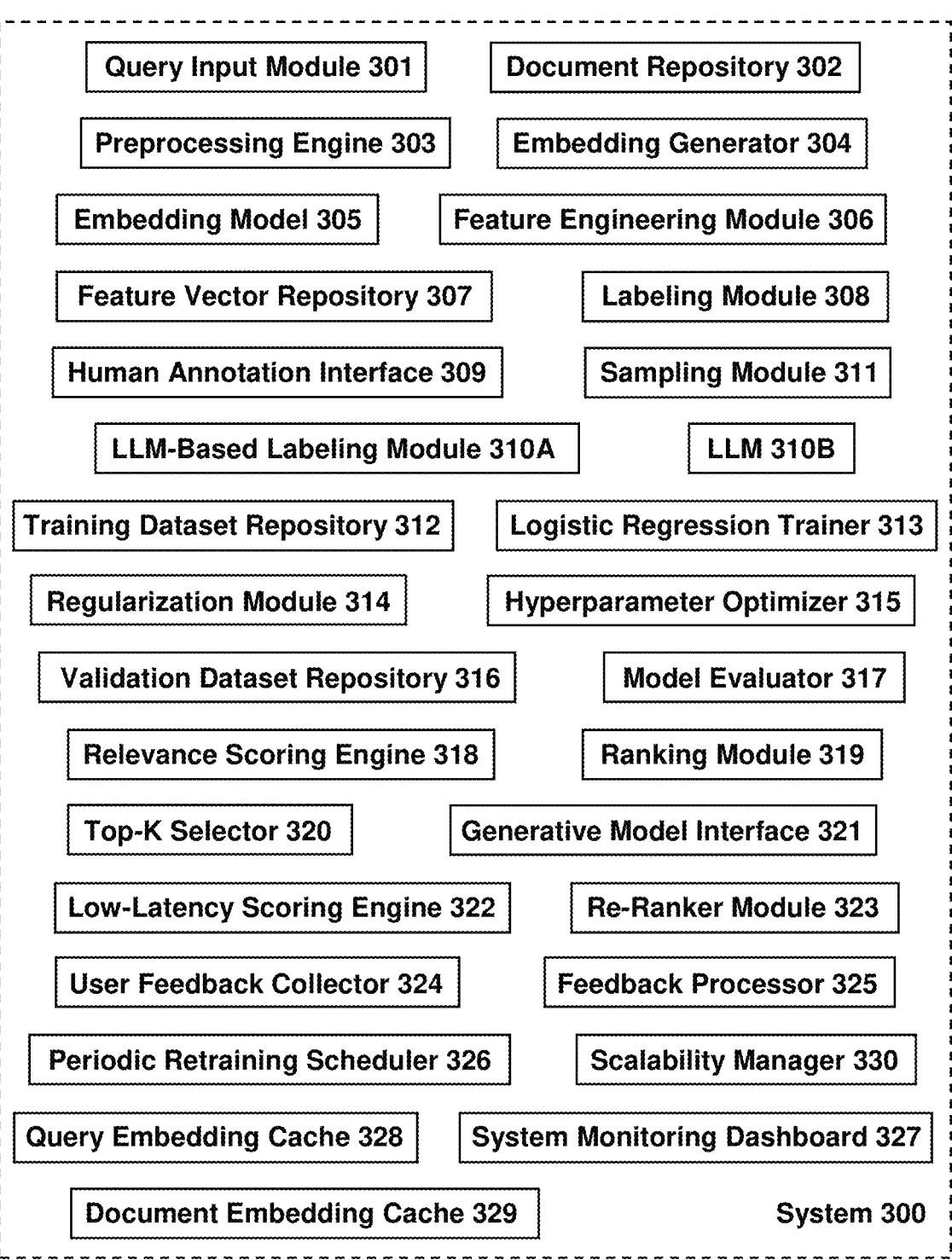

Query Input Module 301          Document Repository 302

Preprocessing Engine 303          Embedding Generator 304

Embedding Model 305          Feature Engineering Module 306

Feature Vector Repository 307          Labeling Module 308

Human Annotation Interface 309          Sampling Module 311

LLM-Based Labeling Module 310A          LLM 310B

Training Dataset Repository 312          Logistic Regression Trainer 313

Regularization Module 314          Hyperparameter Optimizer 315

Validation Dataset Repository 316          Model Evaluator 317

Relevance Scoring Engine 318          Ranking Module 319

Top-K Selector 320          Generative Model Interface 321

Low-Latency Scoring Engine 322          Re-Ranker Module 323

User Feedback Collector 324          Feedback Processor 325

Periodic Retraining Scheduler 326          Scalability Manager 330

Query Embedding Cache 328          System Monitoring Dashboard 327

Document Embedding Cache 329          System 300

*Fig. 3*

ENHANCED RANKING AND RETRIEVAL OF DOCUMENTS AND INFORMATION BY UTILIZING AN IMPROVED RETRIEVAL-AUGMENTED GENERATION (RAG) SYSTEM

FIELD

Some embodiments are related to the field of computerized systems.

BACKGROUND

A large corporation, organization, or other entity may have thousands of team-members who utilize computing devices for various purposes; for example, to send and receive electronic mail, to engage in video calls, to browse the Internet, to compose documents, to access data repositories, or the like.

The organization may accumulate and store a large volume of documents and data-items, such as textual files, spreadsheets, presentations, multimedia files, raw data, or the like. Some organizations may use a search module to enable team-members to search through such large body-of-knowledge, or to assist team-members in retrieving information from an organizational repository or data-lake.

SUMMARY

Some embodiments may provide enhanced ranking and retrieval of documents and information, particularly by utilizing an improved Retrieval-Augmented Generation (RAG) system; as well as computerized methods for implementing improved RAG processes.

For example, a computerized method comprises: (a) collecting historical query-document data from past interactions of users with a Retrieval-Augmented Generation (RAG) system in which the RAG system retrieved documents in response to user queries; (b) defining relevance criteria that determine whether or not a particular document that was retrieved by the RAG system is relevant to a particular query that was posed to the RAG system; (c) labeling query-document pairs with a binary relevance indicator of either Relevant or Irrelevant; (d) encoding queries and documents into numerical embedding vectors using a pre-trained embedding model; (e) generating feature vectors by performing element-wise multiplication of corresponding components of query embeddings and document embeddings; (f) organizing the feature vectors into a structured dataset; and splitting the structured dataset into (I) a training subset of feature vectors and (II) a validation subset of feature vectors; (g) training a logistic regression Machine Learning (ML) model using the training subset to predict the relevance of query-document pairs, and validating the logistic regression ML model using the validation subset; (h) integrating the trained logistic regression ML model into said RAG system for real-time relevance scoring of documents that the RAG system retrieves in response to new user queries.

Some embodiments may provide other and/or additional benefits and/or advantages.

BRIEF DESCRIPTION OF THE DRAWINGS

FIGS. 2A and 2B are two parts of a flow-chart of operations for enabling improved Information Retrieval (IR), in accordance with some demonstrative embodiments.

FIG. 3 is a schematic block-diagram illustration of a system configured to provide improved RAG processes, in accordance with some demonstrative embodiments.

DETAILED DESCRIPTION OF SOME DEMONSTRATIVE EMBODIMENTS

Figure 1:
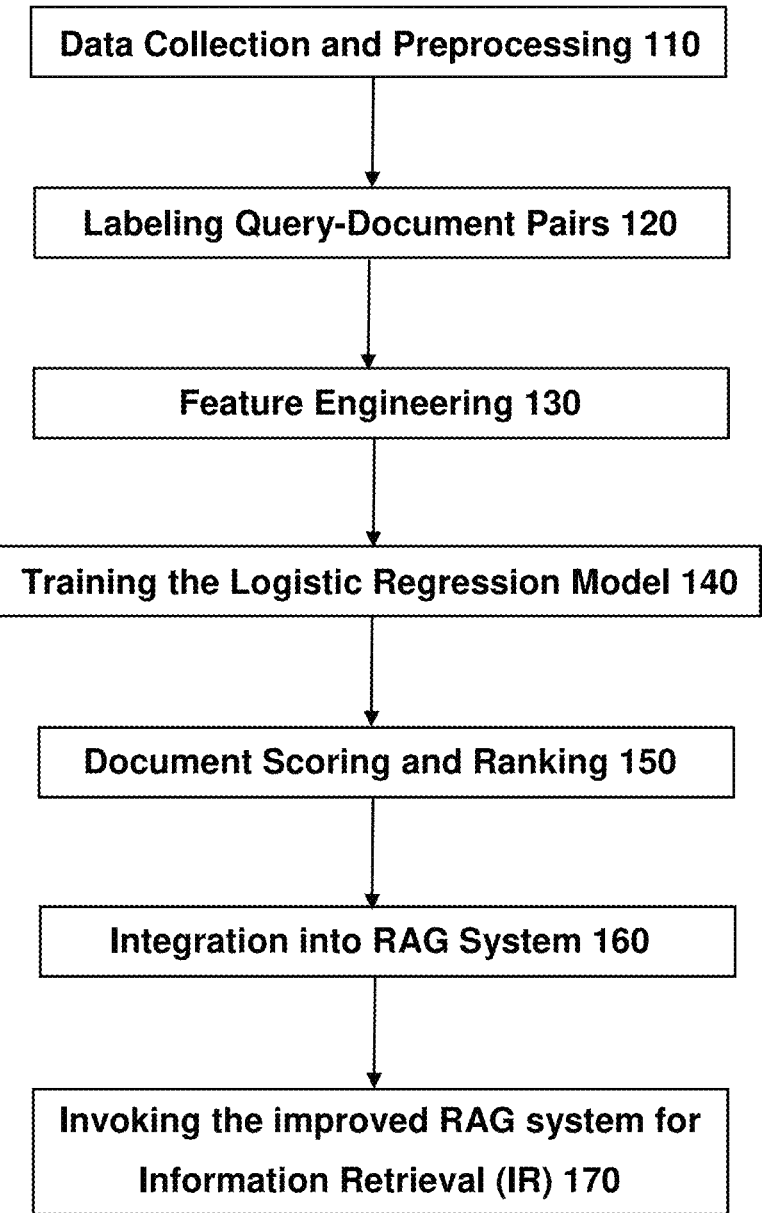
FIG. 1 is a flow-chart of a computerized method, in accordance with some demonstrative embodiments.

The Applicant has realized that in the field of data security and analytics, the ability to retrieve and present accurate and relevant information is important. Retrieval-Augmented Generation (RAG) systems combine information retrieval techniques with Generative Artificial Intelligence (Gen-AI) models to provide comprehensive responses to user queries.

The Applicant has realized that some conventional RAG systems rank the relevance of retrieved documents using cosine similarity between query and document embeddings. However, realized the Applicant, cosine similarity assumes that all components of the embedding vectors contribute equally to the relevance score. The Applicant has thus realized that such cosine similarity ranking algorithms, that employ a uniform weighting and a weight-agnostic approach, fail to take into account the varying importance or the differential weights that can be assigned to different features within the embeddings, thus leading to sub-optimal or inaccurate retrieval performance. As a result, realized the Applicant, some users may receive less relevant or irrelevant documents, or may not receive the relevant or the most-relevant result from the system; and such sub-optimal performance can diminish the effectiveness of the system, can reduce user satisfaction, and/or can negatively impact decision-making processes that rely on precise data.

The Applicant has realized that in systems that store and retrieve documents and data, retrieval of precise and relevant information can be crucial for a variety of reasons or goals, such as data protection, security, compliance with regulatory or contractual obligations, threat detection, and the need to make decisions or to take actions based on the most relevant/ most accurate data or document.

Some embodiments may thus address or cure or mitigate the limitations that derive from using cosine similarity in RAG-based systems for document retrieval and information retrieval. Some embodiments provide computerized systems and methods for improved ranking and retrieving of documents or information or data-items, by employing a supervised Machine Learning (ML) or Deep Learning (DL) model (e.g., a logistic regression ML model) that learns optimal weights for the components of the embedding vectors based on labeled data; and thus enables to invoke cosine similarity processes that are not weight-agnostic or relevance-agnostic, but rather, reflect a differential weight for embeddings within the same vector.

Some embodiments may include the following steps or operations:

Firstly, the computerized method performs Data Collection and Labeling: the method collects a representative dataset of query-and-document pairs (or, query-document pairs) from the RAG system. This can be achieved, for example, by utilizing a Large Language Model (LLM) and/or by utilizing user feedback to label these pairs with binary relevance indicators (e.g., relevant or irrelevant).

Secondly, the computerized method performs Feature Engineering: for each labeled query-document pair, the method computes element-wise products of their embeddings to create feature vectors that capture the interaction between query and document features.

Thirdly, the computerized method performs Model Training: the method trains (and optionally, periodically re-trains) a logistic regression ML model on the labeled feature vectors, to learn weights that represent the importance of each embedding component in predicting document relevance.

Finally, the computerized method performs Document Scoring and Ranking: the method uses the trained ML model to compute relevance scores for new query-document pairs, allowing for more accurate ranking of documents based on the learned importance-level of each feature.

Accordingly, an improved RAG system can integrate the above-mentioned method to assign different weights to embedding components, thereby reflecting their true significance in determining relevance. This approach can lead to improved retrieval accuracy, providing users with more relevant documents and/or with the most-relevant document (s) or result(s) or output(s), and/or to enhancing the overall performance of data storage and retrieval systems.

The Applicant has realized that some conventional information retrieval systems utilize a weight-agnostic or importance-agnostic Cosine Similarity algorithm, which is used as an agnostic measure of similarity between two vectors, and that assumes equal weighting of all vector components. The Applicant has realized that this approach, while it can be useful in some scenarios, does not account for varying level-of-importance of different features.

The Applicant has also realized that some conventional "learning to rank" algorithms, such as RankNet or LambdaMART, apply gradient boosting to ranking problems. However, realized the Applicant, these algorithms typically require extensive labeled data and computational resources, and/or do not perform direct weighting of embedding components. Accordingly, some embodiments do not utilize a Boosted Tree based ranking.

The Applicant has further realized that some Supervised Semantic Indexing (SSI) or Latent Semantic Indexing (LSI) methods may involve learning a transformation of embeddings into a common space where similarity reflects relevance, typically using Neural Networks (NNs). However, these algorithms typically user Singular Value Decomposition (SVD) to identify patterns in relationships between texts and concepts in a collection of data, to create a Text Document Matrix (DTM), and then to reduce its dimensionality to create a more compact "latent semantic space". Some embodiments do not utilize an SSI-based/LSI-based method, and do not utilize a SVD or DTM creation or reduction.

In accordance with some embodiments, a weighted Cosine Similarity algorithm can introduce weights into the cosine similarity calculation; and instead of utilizing predefined or manually-adjusted weights, some embodiments dynamically define and determine weights that are automatically learned from data.

The Applicant has realized that Information Retrieval (IR) can be improved by using a tailored ML model, and particularly by utilizing logistic regression to autonomously learn weights for embedding components in a RAG system based on labeled query-document pairs. Some embodiments thus apply logistic regression to directly learn the optimal weights for the embedding components from labeled data within a RAG framework, providing an innovative and effective solution to the problem of accurate document retrieval and accurate IR.

Some embodiments provide computerized methods to improve the relevance of document retrieval in Retrieval-Augmented Generation (RAG) systems, by utilizing logistic regression to learn optimal weights for embedding vector components based on labeled query-document pairs. By moving beyond the equal-weight assumption of cosine similarity, the proposed method assigns varying importance to different features, leading to more accurate and relevant document retrieval and IR. This approach directly addresses and/or avoids the limitations of traditional methods, thereby enhancing the performance of AI-driven applications in data security and analytics and in IR.

The effectiveness of a Retrieval-Augmented Generation (RAG) system largely depends on its ability to retrieve and accurately utilize relevant documents in response to user queries. Conventional methods employing cosine similarity for document retrieval assume equal contribution of all embedding components to the relevance score. To address the shortcomings of this assumption, the method of some embodiments leverages logistic regression to learn and assign optimal weights to embedding components based on labeled data, thereby improving the retrieval of relevant documents in a RAG system.

Reference is made to FIG. 1, which is a flow-chart of a computerized method in accordance with some demonstrative embodiments. The method may include, for example: Data Collection and Preprocessing (block 110); Labeling Query-Document Pairs (block 120); Feature Engineering (block 130); Training the Logistic Regression Model (block 140); Document Scoring and Ranking (block 150); Integration into the RAG System (block 160); Invoking the RAG system for improved Information Retrieval (IR) and for obtaining more relevant and/or more accurate responses to user queries (block 170).

The step of Data Collection and Preprocessing receives as input: Historical data from the RAG system, containing user queries and the documents (or single document, or document-portion) that were retrieved by the RAG system in response to each such user query.

For example, the user query of "How do I reset my email password?", was responded by the RAG system with the following documents or data-items or document-portions or strings: (a) "To reset your email password, click on the link 'Forgot Password' on the login page and follow the instructions", and (b) "Resetting your password typically requires access to your recovery email or phone number for verification", and (c) "Email marketing can significantly boost your business's engagement and sales".

In another example, the user query of "Why is my laptop overheating?", was responded by the RAG system with the following documents or data-items or document-portions or strings: (a) "Laptops can overheat due to dust blocking vents or the cooling fan malfunctioning", and (b) "High CPU usage from running too many applications can cause your laptop to overheat", and (c) "Laptop screens have become more energy-efficient with advancements in LED technology".

In this step, the method aggregates or constructs a dataset of query-document pairs that reflect the diversity of queries and documents encountered in practical use. The method is configured to ensure that the constructed dataset includes both relevant and irrelevant pairs, in order to provide balanced training data. In the above-mentioned examples, each of the two examples can generate three pairs of query-response (or query-document), even if the first response out of each three is the most "correct" or the most "relevant" relative to the other two responses. In some embodiments, this step can be configured to be performed for the specific organization or enterprise that desires to improve its RAG systems and its IR processes; for example, for a bank or banking entity, for a hospital or medical care facility, for a school or an academic institution, for a retail business, or the like. The output of this step is comprehensive dataset of query-document pairs, that is then utilized for further analysis and for component weighting.

The method may proceed to perform Smart Sampling to the dataset, and/or to create a representative and manageable subset of the data for further labeling and model training. For example, the method applies sampling techniques, such as stratified sampling, to maintain the distribution of relevant and irrelevant pairs; and clustering techniques can be used to ensure diversity in terms of query topics and document content. The output of this stage is a sampled dataset (or, subset of the original dataset) that is representative of the overall data distribution.

The method then proceeds to Compute Embeddings. The input of this stage is the textual data from queries and documents. The method utilizes a pre-trained embedding model, such as Bidirectional Encoder Representations from Transformers (BERT) or Robustly optimized BERT approach (RoBERTa), to convert queries and documents into numerical embedding vectors of dimension n. The method ensures that both queries and documents are encoded using the same embedding model, for consistency. The output of this stage are embedding vectors for all queries (q) and documents (d).

The method proceeds with Labeling Query-Document Pairs, by defining relevance criteria or defining clear guidelines for what constitutes relevance between a query and a document. Some embodiments may consider factors such as, for example, topic alignment, information completeness, user intent, and/or other criteria. In a first example, the query of "How do I reset my email password?", and the document or document-portion or string "To reset your email password, click 'Forgot Password' on the login page and follow the instructions", form a query-document pair that should be labeled as "1" as a Positive Example, since the document is relevant to the query. In a second example, the query "Why is my laptop overheating?", and the document or document-portion or string "Laptop screens have become more energy-efficient with advancements in LED technology", form a query-document pair that should be labeled as "0" as a Negative Example, since the document is irrelevant to the query or does not respond to the question posed in the query.

The labeling of pairs of query-document may be performed automatically using a Large Language Model (LLM), and/or manually based on user feedback that had been provided by users to IR responses, and/or manually based on human labeling and annotations.

The LLM-based labeling may utilize an LLM, such as OpenAI ChatGPT or Google Gemini or Microsoft Copilot or Anthropic Claude or Meta Llama, to evaluate the relevance of each query-document pair, or to evaluate whether or not the document part in a query-document pair is a relevant response (or, a correct response; or, a useful response) to the question posed in the query part of that query-document pair. The automated LLM-based labeling may provide prompts to the LLM, instructing it to assess relevance according to the defined criteria and/or according to the general body-of-knowledge on which the LLM was trained. A demonstrative prompt to the LLM can be, for example, "Given the following query and document, please determine if the document provides relevant information to answer the query; Respond with Yes for relevant or No for irrelevant"; or, for example, "Given the following query and document, please evaluate whether the document provides a correct and useful answer to the query; Respond with 1 for yes or 0 for no". The automated LLM-based labeling can leverage the advanced language understanding capabilities of an LLM, to rapidly label thousands of such query-document pairs.

Additionally or alternatively, labeling may be based on User Feedback that had been provided to actual queries and actual responses by the RAG system. The method may collect feedback from users on the relevance of documents that were presented to them in response to their queries; such as, using a button or link that indicates "thumbs-up"/ "thumbs-down" voting by users, a user's ranking or scoring of responses to IR requests, and/or explicit indicators from users whether the response was "relevant/irrelevant" or "correct/incorrect" or "useful/useless" or "helpful/non-helpful". This approach allows the system to use real-world relevance assessments of actual response to actual queries, by actual users of the RAG system or the IR system that is being improved. The user feedback can be collected passively during normal system use, accumulating thousands of such relevance indicators from users over time.

Additionally or alternatively, Manual Annotation or Manual Labeling may be performed, in which human annotators perform labeling of query-document pairs based on the relevance criteria. The human annotators can be provided with training and guidelines to ensure accuracy in labeling and consistency across multiple human annotators. Such manual annotation may yield high-quality labels, as well as improved control over labeling accuracy.

The method may finalize the labeling process combining labels from different labeling methods (if more than one were used); and to resolve discrepancies through majority voting or expert review, or based on pre-defined prevailing rules (e.g., human annotator prevails over LLM-based annotation in case of conflict). The output of this stage is a labeled dataset with binary relevance indicators for each query-document pair; such as y=1 for relevant and y=0 for irrelevant.

The method then proceeds to perform Feature Engineering. Firstly, the method performs Element-wise Multiplication of Embeddings, in order to capture the interaction between corresponding components of query and document embeddings.

For example, for each query-document pair, the method performs element-wise multiplication of their embeddings to create a feature vector. This can be represented using the following mathematical representation:

$$x_i = q_i \times d_i \text{ for } i=1,2,\ldots,n$$

In the above representation, $x_i$ is the i-th feature in the feature vector x; and $q_i$ is the i-th component of the query embedding q; and $d_i$ is the i-th component of the document embedding d; and n is the dimensionality of the embeddings.

The output of this process is Feature Vectors x for all the query-document pairs.

The process of Feature Vector Construction includes assembling the computed features into a vector $x=[x_1, x_2, \ldots, x_n]$ for each query-document pair. In some embodiments, additional features can be included if relevant (e.g., embedding norms, metadata).

The method proceeds to perform Training of the Logistic Regression Model, which estimates the probability that a given query-document pair is relevant (namely, that the document-part of the pair is a relevant/correct/useful response to the query-part of the pair), based on the feature vector x.

Some embodiments may use the following Logistic Regression model equation:

$$P(y = 1 \mid x) = \frac{1}{1 + e^{-(\beta_0 + \Sigma_{i=1}^{n} \beta_i x_i)}}$$

In the above-mentioned equation, $\beta_0$ is the intercept (bias term); and $\beta_i$ is the coefficient (weight) for feature $x_i$; and y is the binary label indicating relevance.

The method then proceeds to perform training of the Logistic Regression model. Firstly, the method prepares the data for the training. The method splits or divides the labeled dataset into a training set and a validation set (e.g., 80% training, 20% validation). Optionally, pre-processing operations may be performed, such as normalizing features if needed; and handling class imbalance using techniques such as resampling or class weights.

In the training process, the method utilizes maximum likelihood estimation to find the optimal coefficients $\beta_i$ that maximize the likelihood of the observed labels given the features. For optimization, the method can employ optimization algorithms such as gradient descent, stochastic gradient descent, or Limited Memory Broyden-Fletcher-Goldfarb-Shanno (L-BFGS or LM-BFGS). For regularization, the method may apply L1 (Lasso) or L2 (Ridge) regularization to prevent overfitting and to encourage sparsity, if appropriate. In some embodiments, tuning of hyperparameter (such as regularization strength) can be performed using cross-validation on the training set.

The method proceeds to perform metrics-based evaluation of the Logistic Regression model, using performance metrics such as, for example: accuracy, precision, recall, F1-score, Arca Under the Receiver Operating Characteristic (ROC) Curve (AUC-ROC), and/or other metrics for model evaluation. The method's validation stage includes assessing the performance of the Logistic Regression model on the validation set, to ensure that it generalizes well to unseen data.

In accordance with some embodiments, the learned coefficients $\beta_i$ can be analyzed to understand the impact of each embedding component on the relevance prediction; and/or to identify which features (which embedding components) are most influential.

The method then proceeds to perform Document Scoring and Ranking. For example, scoring of a new query-document pair receives as input: a new query from a user, in a textual form; and Document Embeddings, which are pre-computed embeddings for documents in the knowledge-base. The scoring of the new query-document pair involves computing of query embedding, by encoding the new query into an embedding vector q using the same embedding model that was utilized during the training. A feature vector x is calculated for each candidate document embedding d, by performing element-wise multiplication of the corresponding elements: $x_i = q_i \times d_i$.

For calculating the Relevance Score, the method uses the trained Logistic Regression model to compute the relevance score (probability) for each document, $P(y=1 \mid x)$.

The method proceeds to perform ranking of documents, based on their computed relevance scores in descending order. For example, the method selects the top K documents to be used in the RAG system for generating responses; and outputs a ranked list of the most relevant documents tailored to the user's query.

The computerized method described above can be integrated into an existing RAG system, and/or can be implemented as an add-on or plug-in or extension to an existing RAG system, and/or can be implemented as part of a new RAG system. The integration in a RAG system may be performed using the following components: (a) an Embedding Module that computes embeddings for queries and documents; (b) a Relevance Scoring Module that applies the trained Logistic Regression model to compute relevance scores; (c) a Retrieval Module that retrieves and ranks documents based on the calculated relevance scores.

In a demonstrative implementation, the improved RAG system can be utilized with the following flow: (a) a user submits a query; (b) query embedding is computed; (c) feature vectors are calculated for candidate documents; (d) relevance scores are computed using the Logistic Regression model; (c) documents are ranked and retrieved; (f) retrieved documents are used by the generative model (e.g., powered by an LLM or other Generative-AI tool) to produce a response.

In some embodiments, optionally, the RAG system is configured such that step (c) retrieves only the Top M documents based on their relevance score; such as, the top 1 document, or the two 2 documents, or the top 3 documents, or the top 5 documents. In some embodiments, additionally or alternatively, the LLM or other Generative-AI tool is configured such that the generative model (e.g., powered by an LLM or other Generative-AI tool) is guided or prompted or commanded to rely only on the Top T documents (based on their relevance scores) from those that were retrieved, such as, the top 1 document, or the two 2 documents, or the top 3 documents, or the top 5 documents.

In some embodiments, the computerized method and/or the system's components may be further fine-tuned or configured to improve performance. For example, in order to increase efficiency, the scoring process can be optimized for low latency, such as through parallelization or efficient computation techniques. The system can further be configured to support scalability and the ability to handle large volumes of queries and documents. Optionally, periodic maintenance or re-training of the Logistic Regression model can be performed; such as, by updating the Logistic Regression model periodically with new data in order to ensure that it adapts to changing user behavior and content. The model's performance can be continuously or periodically monitored, to trigger adjustments or modifications or re-training if necessary.

Some embodiments may provide various advantages relative to conventional and weight-agnostic Cosine Similarity IR systems. Such advantages may include, for example: (a) Learned Feature Importance, as the system learns weights from data, and the Logistic Regression model can assign higher importance to features that contribute more to relevance; (b) Improved Retrieval Accuracy, as the system can achieve enhanced ability to retrieve truly relevant documents, leading to better responses from the RAG system; (c) Flexibility, as the method can incorporate additional features and be extended with more complex models if needed.

Some embodiments can perform experimental evaluation (s) to ensure that the Logistic Regression model operates accurately or in a satisfactory manner. For example, experiments can be conducted to compare the proposed method with traditional cosine similarity on benchmark datasets or on real-world data. Evaluation metrics may include, for example, Precision@K, Recall@K, Mean Reciprocal Rank (MRR), and Mean Average Precision (MAP). Some experiments performed by the Applicant has demonstrated statistically significant improvements in retrieval performance. The system's improved performance can further be evaluated through specific case studies, in which specific examples are analyzed, showing that the Logistic Regression model outperforms weight-agnostic cosine similarity, indicating that it is advantageous to utilize learned feature weights in IR systems.

In some embodiments, the system's input includes: (a) a User Query, which is a textual query submitted by the user; and (b) a Knowledge Base, which is a collection of documents with pre-computed embeddings.

The system computes the embedding for the user query. Then, for each document in the candidate set, the system computes the feature vector by multiplying the query embedding with the document embedding element-wise. The system uses the trained Logistic Regression model to compute the relevance score for each document; and then ranks documents based on the relevance scores that were computed using the trained Logistic Regression model. The system produces as output, for example, (a) a set of Ranked Documents, ordered by predicted relevance to the user's query, and (b) their respective Relevance Scores, each relevance score being a probability score indicating the likelihood that the respective document is relevant to answer this user query.

Some embodiments may be integrated with or into, or can be implemented as an extension or add-on or plug-in, to a Data Security Platform (DSP), a Data Security Posture Management (DSPM) system, a Data Discovery and Classification system, a cloud-based Data Loss Prevention (DLP) system, a User and Entity Behavior Analytics (UEBA) system, a Managed Data Detection and Response (MDDR) system, a data storage and retrieval system, an AI-based or AI-driven information retrieval system that utilizes an AI-based tool or an AI-based chat-bot or an LLM or an LLM-based chat-bot to answer user queries based on a repository of documents and/or to provide to users retrieved documents (or document-portions, or document-segments, or document highlights, or document summaries) in response to user queries, a data security and analytics platform, a system for storing or managing a "data lake" or a "data silo" and for retrieving information therefrom, a local or on-premises repository of documents or data-items, a cloud-based or server-side or remote repository of documents or data-items, a set of virtual and/or physical drives and/or folders and/or files and/or documents that can be searched or queried via a search module or a query module, a Customer Relationship Management (CRM) system that has or that uses IR components, a Supply Chain Management (SCM) system that has or that uses IR components, an Enterprise Resource Planning (ERP) system that has or that uses IR components, a group-messaging or team-based messaging platform that enables users to share information and to retrieve information or to query for information, and/or other platforms or systems that can benefit from improving the relevance of document retrieval in Retrieval-Augmented Generation (RAG) systems.

Some embodiments provide a computerized method for improving document retrieval in a Retrieval-Augmented Generation (RAG) system, the method comprising: collecting and preprocessing historical user queries and corresponding retrieved documents to construct query-document pairs; labeling the query-document pairs with binary relevance indicators based on predefined relevance criteria; generating feature vectors for query-document pairs by performing element-wise multiplication of their embeddings; training a logistic regression model on the labeled feature vectors to learn optimal weights for embedding components; evaluating the trained logistic regression model using validation data and performance metrics to ensure accuracy; computing relevance scores for new query-document pairs using the trained logistic regression model; ranking the documents based on computed relevance scores and presenting the most relevant documents to the user.

Some embodiments provide a computerized method for optimizing information retrieval in artificial intelligence-driven systems, the method comprising: collecting and aggregating diverse query-document pairs from user interactions in the Retrieval-Augmented Generation system; labeling query-document pairs using automated methods, such as large language models or manual annotations; creating embedding vectors for queries and documents using a pre-trained embedding model; calculating feature vectors by multiplying corresponding embedding components of query and document pairs; training a logistic regression model to assign differential weights to embedding components; integrating the logistic regression model into the Retrieval-Augmented Generation system; ranking documents based on relevance scores and improving system responses to user queries.

Some embodiments provide a computerized method for enhancing relevance scoring in information retrieval systems, the method comprising: constructing a dataset of query-document pairs based on historical system performance; applying stratified sampling to ensure representative data subsets for labeling and training; labeling query-document pairs for relevance using human annotators or automated processes; generating feature vectors that represent query-document interaction through element-wise embedding multiplication; training a logistic regression model to predict relevance probabilities based on labeled feature vectors; computing relevance scores for new queries using the trained logistic regression model; selecting and presenting top-ranked documents to users based on relevance scores.

Some embodiments provide a computerized method for dynamically assigning weights in information retrieval systems, the method comprising: collecting diverse and representative query-document pairs from system-generated interactions; labeling pairs for relevance using user feedback and predefined guidelines; computing embeddings for queries and documents using a unified embedding model; constructing feature vectors by calculating the element-wise product of query and document embeddings; training a logistic regression model to learn optimal weights for embedding components; computing relevance scores for unseen query-document pairs using the trained logistic regression model; ranking and retrieving documents based on their computed relevance scores for user queries.

Some embodiments provide a computerized method for improving machine learning-based document retrieval, the method comprising: gathering user interaction data from a Retrieval-Augmented Generation system to construct query-document pairs; preprocessing and labeling query-document pairs using criteria for topic alignment and information completeness; encoding queries and documents into numerical embeddings using a pre-trained model; generating feature vectors through element-wise multiplication of embedding components; training a logistic regression model to assign varying weights to embedding features; ranking documents based on relevance scores computed with the logistic regression model; delivering the most relevant documents to users based on computed relevance scores.

Some embodiments provide a computerized method for personalized information retrieval in artificial intelligence systems, the method comprising: aggregating query-document pairs based on historical interactions and user feedback; labeling query-document pairs with binary relevance indicators using predefined guidelines; creating embedding vectors for queries and documents using a transformer-based embedding model; performing feature engineering to capture query-document relationships through embedding interactions; training a logistic regression model to predict relevance based on feature vectors; computing relevance scores for user queries using the trained model; ranking and retrieving documents to provide the most accurate and relevant results to users.

Some embodiments provide a computerized method for advancing document ranking accuracy in information retrieval systems, the method comprising: collecting data from user interactions to form labeled query-document pairs; preprocessing query-document pairs to remove noise and ensure data quality; encoding the textual content of queries and documents into embedding vectors; engineering features by computing element-wise interactions between query and document embeddings; training a logistic regression model to optimize relevance weighting of embedding features; computing scores for new query-document pairs using the trained model; ranking documents based on scores and integrating results into the Retrieval-Augmented Generation system.

Some embodiments provide a computerized method for weighting embedding features in machine learning-based information retrieval, the method comprising: collecting query-document pairs from user interactions in a knowledge retrieval system; labeling query-document pairs as relevant or irrelevant using automated and manual methods; generating embedding vectors for queries and documents using a unified embedding model; constructing feature vectors that represent query-document relationships through embedding operations; training a logistic regression model on labeled feature vectors to learn feature importance; computing relevance probabilities for unseen query-document pairs; ranking documents to improve retrieval accuracy and user satisfaction.

Some embodiments provide a computerized method for improving retrieval in AI-powered systems, the method comprising: collecting a diverse dataset of historical queries and documents from the system; labeling query-document pairs for relevance using predefined criteria or user feedback; computing embedding vectors for both queries and documents using a pre-trained model; creating feature vectors to capture embedding relationships for relevance determination; training a logistic regression model to optimize relevance scoring; computing and assigning relevance scores to candidate documents for new queries; ranking and presenting documents based on their scores to enhance system responses.

Some embodiments provide a computerized method for optimizing retrieval in information systems, the method comprising: constructing a labeled dataset of query-document pairs using diverse interaction data; preprocessing and labeling pairs for relevance using automated and manual methods; encoding queries and documents into embeddings with a consistent pre-trained model; calculating feature vectors through embedding interactions for query-document pairs; training a logistic regression model to assign importance to embedding features; scoring documents for relevance using the trained model; ranking and retrieving the top-scored documents to improve system-generated responses.

Some embodiments may provide a method that performs some, or most, or all of the following operations, for improving document retrieval in a Retrieval-Augmented Generation system; the method comprising: collecting and preprocessing historical query-document interaction data to construct pairs representing diverse user queries and corresponding retrieved documents; labeling the query-document pairs with binary relevance indicators using predefined criteria, automated tools, or manual annotation processes; sampling the labeled dataset to create a representative subset while maintaining the distribution of relevant and irrelevant examples; encoding textual content of queries and documents into embedding vectors using a pre-trained embedding model to ensure consistency; performing element-wise multiplication of query and document embeddings to generate feature vectors capturing their interactive relationships; assembling feature vectors into a structured dataset for model training, incorporating optional metadata or additional relevant features if necessary; splitting the dataset into training and validation subsets to ensure robust performance evaluation during model development; training a logistic regression model on the labeled feature vectors to learn optimal weights for embedding components; applying one or more regularization techniques, such as L1 or L2 regularization, to prevent overfitting and encourage model generalization; evaluating the model using validation data and metrics, including accuracy, precision, recall, F1-score, and AUC-ROC, to ensure high performance; computing relevance scores for new query-document pairs by applying the trained logistic regression model to their corresponding feature vectors; ranking candidate documents in descending order of computed relevance scores for efficient retrieval tailored to user queries; retrieving the top-ranked documents based on their relevance scores for further processing by the Retrieval-Augmented Generation system; integrating the trained logistic regression model and ranking mechanism into the existing Retrieval-Augmented Generation system architecture. Some additional or optional operations may include, for example: ensuring low latency during scoring and ranking operations through parallelization or other efficient computational techniques; supporting scalability of the system to handle high volumes of queries and large document repositories in practical deployments; periodically retraining the logistic regression model with updated data to adapt to evolving user behavior and content dynamics; monitoring system performance through continuous evaluation to identify and address potential issues or degradation in relevance accuracy; applying the ranked documents as input to a generative model for generating contextually relevant and accurate responses to user queries; delivering improved Retrieval-Augmented Generation system performance, enabling users to receive the most relevant and accurate document-based outputs.

Some embodiments may provide a method that performs some, or most, or all of the following operations, for enhancing document retrieval in a Retrieval-Augmented Generation system; the method comprising: gathering historical data of query-document interactions to establish a comprehensive dataset of system-generated responses; preprocessing the collected data to ensure consistency, eliminate noise, and structure query-document pairs effectively; constructing query-document pairs to represent various types of user queries and their corresponding retrieved documents; defining relevance criteria to guide the labeling process, ensuring alignment with user intent and contextual accuracy; labeling query-document pairs using predefined guidelines, automated tools like language models, or manual human annotations; validating the labeled dataset by reviewing for consistency, completeness, and adherence to relevance definitions; sampling the dataset to create a manageable subset that reflects the diversity and balance of relevant and irrelevant pairs; generating embedding vectors for both queries and documents using a pre-trained model designed for natural language processing tasks; encoding queries and documents consistently to ensure embeddings are comparable across the dataset; computing feature vectors by performing element-wise multiplication of the query and document embeddings; organizing the computed feature vectors into a structured dataset, including optional metadata for enhanced feature representation; dividing the dataset into separate subsets for training and validation to support robust model development; initiating the training process for a logistic regression model to predict relevance based on the feature vectors; optimizing model training through techniques like gradient descent and regularization to enhance model performance and generalization; performing hyperparameter tuning, such as adjusting regularization strength, to achieve optimal model configuration; evaluating model accuracy using metrics like precision, recall, and F1-score to ensure relevance predictions are reliable; assessing the model's performance on validation data to confirm its ability to generalize to unseen queries; applying the trained logistic regression model to compute relevance scores for unseen query-document pairs; ranking documents for new queries based on relevance scores generated by the logistic regression model; retrieving the top-ranked documents for user queries to optimize response quality and user satisfaction; integrating the scoring and ranking components into the Retrieval-Augmented Generation system to support seamless operation; delivering improved document retrieval by presenting users with more relevant and accurate results from the system.

In some embodiments, the preprocessing step includes tokenizing textual data to remove special characters and standardize text formatting.

In some embodiments, the relevance criteria include user intent, topic alignment, and completeness of information within the document.

In some embodiments, labeling query-document pairs involves automated evaluation using a large language model (LLM) for consistency and scalability.

In some embodiments, manual annotation is performed by trained human reviewers to ensure high-quality relevance labels for the dataset.

In some embodiments, embeddings are generated using a transformer-based model, such as Bidirectional Encoder Representations from Transformers (BERT) or ROBERTa.

In some embodiments, the embedding model is fine-tuned on domain-specific data to improve representation of queries and documents.

In some embodiments, the element-wise multiplication process captures contextual relationships between embedding components of queries and documents.

In some embodiments, additional features, such as query length and document metadata, are incorporated into the feature vectors.

In some embodiments, the training dataset is balanced using resampling techniques to address potential class imbalance issues.

In some embodiments, the logistic regression model includes L1 or L2 regularization to mitigate overfitting and enhance generalization capability.

In some embodiments, hyperparameter optimization is performed using grid search or randomized search for tuning model parameters.

In some embodiments, the model evaluation includes calculating the Area Under the Receiver Operating Characteristic (ROC) Curve to assess relevance prediction performance.

In some embodiments, relevance scores are normalized to enable comparison across diverse query-document pairs.

In some embodiments, the top-ranked documents are filtered using additional criteria, such as document publication date, or user-defined preferences.

In some embodiments, low-latency computation is achieved using parallel processing of feature vector generation and relevance scoring.

In some embodiments, the logistic regression model is periodically retrained to adapt to changes in user behavior and document content.

In some embodiments, the ranking process includes weighting recent user interactions more heavily to reflect current information needs.

In some embodiments, evaluation of the improved Retrieval-Augmented Generation system uses Mean Average Precision (MAP) as a primary performance metric.

In some embodiments, the system integrates seamlessly with generative artificial intelligence models to generate contextually relevant responses for user queries.

Figure 2B:
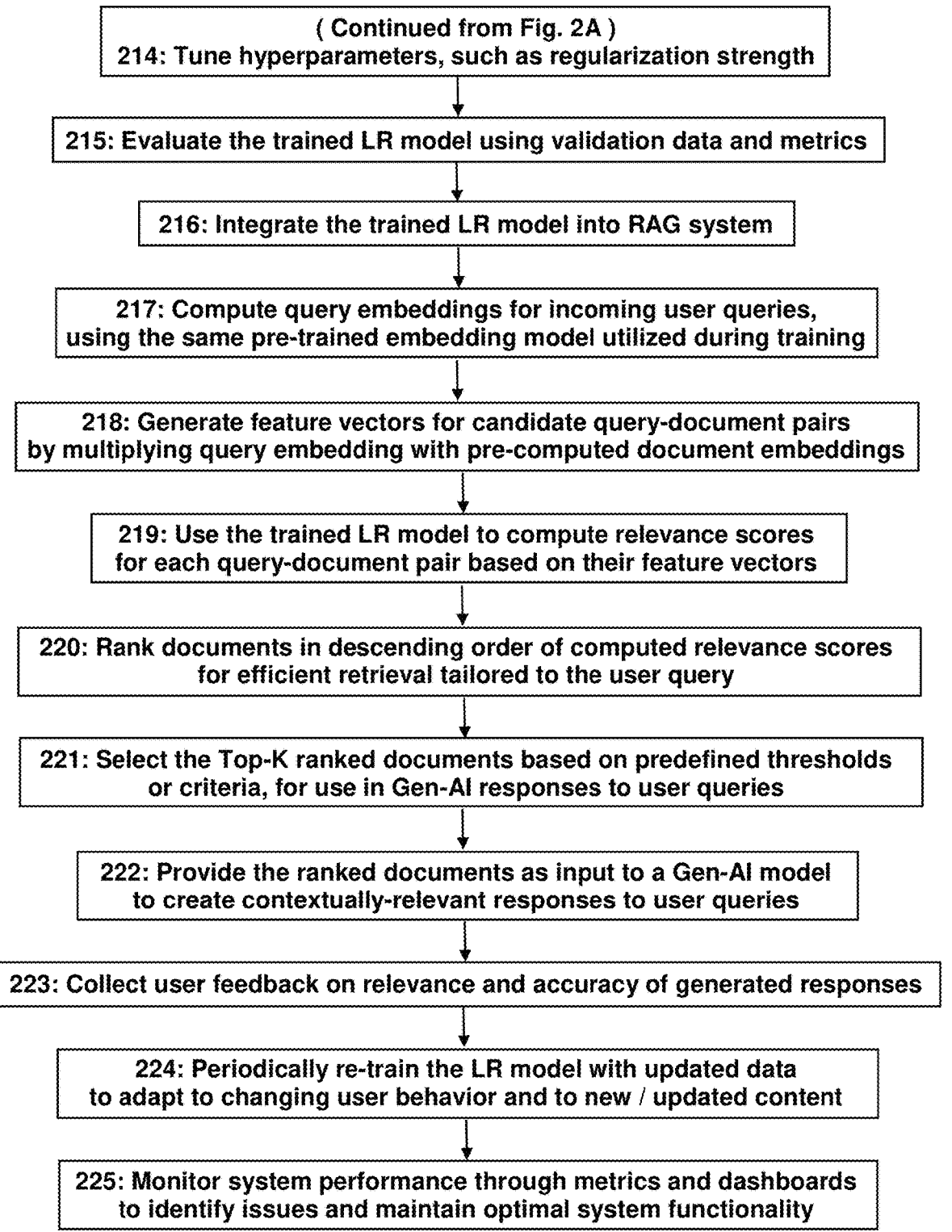

Reference is made to FIGS. 2A and 2B, which together are a flow-chart of operations for enabling improved Information Retrieval (IR), in accordance with some demonstrative embodiments. Some, or most, or all, of the following operations may be performed.

Step 201: Collect historical query-document interaction data from the Retrieval-Augmented Generation system's past user queries and retrieved documents.

Step 202: Preprocess the collected data by normalizing text, removing noise, and ensuring consistent formatting of queries and documents.

Step 203: Construct query-document pairs by associating each user query with its corresponding retrieved documents or document portions.

Step 204: Define relevance criteria to determine whether a document is relevant to the query based on user intent and context.

Step 205: Label query-document pairs with binary relevance indicators using automated tools, manual annotation, or user feedback mechanisms.

Step 206: Validate the labeled dataset to ensure consistency, completeness, and alignment with the defined relevance criteria.

Step 207: Sample the labeled dataset using stratified sampling techniques to create a representative subset for training and validation.

Step 208: Encode queries and documents into numerical embedding vectors using a pre-trained embedding model, such as BERT or ROBERTa.

Step 209: Generate feature vectors by performing element-wise multiplication of corresponding components of query and document embeddings.

Step 210: Organize the feature vectors into a structured dataset, incorporating optional metadata if necessary for enhanced feature representation.

Step 211: Split the structured dataset into training and validation subsets to support robust model development and performance evaluation.

Step 212: Train a logistic regression model using the training subset to predict the relevance of query-document pairs.

Step 213: Apply regularization techniques, such as L1 or L2, during model training to prevent overfitting and improve generalization.

Step 214: Tune hyperparameters, such as regularization strength, using grid search or randomized search to optimize model performance.

Step 215: Evaluate the trained model using validation data and metrics, including precision, recall, F1-score, and AUC-ROC.

Step 216: Integrate the trained logistic regression model into the Retrieval-Augmented Generation system for real-time relevance scoring.

Step 217: Compute query embeddings for incoming user queries using the same pre-trained embedding model utilized during training.

Step 218: Generate feature vectors for candidate query-document pairs by multiplying the query embedding with precomputed document embeddings.

Step 219: Use the trained logistic regression model to compute relevance scores for each query-document pair based on their feature vectors.

Step 220: Rank documents in descending order of computed relevance scores for efficient retrieval tailored to the user query.

Step 221: Select the top-K ranked documents based on predefined thresholds or criteria for use in generating system responses.

Step 222: Provide the ranked documents as input to a generative artificial intelligence model to create contextually relevant user responses.

Step 223: Collect user feedback on the relevance and accuracy of generated responses to improve future query-document pair labeling.

Step 224: Periodically retrain the logistic regression model with updated data to adapt to changing user behavior and content.

Step 225: Monitor system performance through metrics and dashboards to identify potential issues and maintain optimal system functionality.

Reference is made to FIG. 3, which is a schematic block-diagram illustration of a system 300 configured to provide improved RAG, in accordance with some demonstrative embodiments. Components of the system may be implemented using suitable hardware units and/or software units.

Query Input Module 301 accepts user queries in textual form and preprocesses them for encoding, including tokenization and normalization to ensure compatibility with the embedding model.

Document Repository 302 stores all candidate documents in a structured database, including metadata and precomputed embeddings, for efficient retrieval and scoring.

Preprocessing Engine 303 cleans and standardizes raw text data, removes noise, and ensures consistent formatting for both queries and documents before embedding generation.

Embedding Generator 304 encodes queries and documents into numerical vectors using a pre-trained embedding model, such as BERT or ROBERTa, to capture semantic meaning.

Embedding Model 305 is a Neural Network (NN) trained to generate contextual embeddings for textual data, ensuring accurate representation of queries and documents.

Feature Engineering Module 306 creates feature vectors by performing element-wise multiplication of query and document embeddings to capture interactive relationships.

Feature Vector Repository 307 stores computed feature vectors for labeled query-document pairs, enabling model training and efficient access during inference.

Labeling Module 308 assigns binary relevance labels to query-document pairs using automated large language models, manual annotation, or user feedback.

Human Annotation Interface 309 allows human reviewers to label query-document pairs manually, ensuring high-quality relevance labels for training datasets.

LLM-Based Labeling Module 310A utilizes an LLM 310B to evaluate and label query-document pairs, leveraging advanced natural language understanding capabilities.

Sampling Module 311 selects a representative subset of labeled data using techniques such as stratified sampling, ensuring balanced training datasets.

Training Dataset Repository 312 stores labeled query-document pairs and feature vectors designated for training the logistic regression model.

Logistic Regression Trainer 313 trains the logistic regression model to assign weights to embedding components, optimizing for relevance prediction.

Regularization Module 314 applies L1 or L2 regularization during model training to mitigate overfitting and encourage sparse or generalized feature weights.

Hyperparameter Optimizer 315 tunes model parameters, such as regularization strength, using techniques like grid search or randomized search for optimal performance.

Validation Dataset Repository 316 stores data subsets for model validation to ensure that predictions generalize well to unseen queries.

Model Evaluator 317 assesses the logistic regression model using metrics like precision, recall, F1-score, and AUC-ROC to verify predictive accuracy.

Relevance Scoring Engine 318 computes relevance scores for query-document pairs using the trained logistic regression model and their corresponding feature vectors.

Ranking Module 319 sorts documents by computed relevance scores in descending order for retrieval and presentation to the user.

Top-K Selector 320 retrieves the top-K ranked documents based on relevance scores, ensuring optimal results for query responses.

Generative Model Interface 321 connects ranked documents with Generative AI models, enabling contextually accurate query responses.

Low-Latency Scoring Engine 322 parallelizes relevance scoring computations for efficient processing and quick system responses to user queries.

Re-Ranker Module 323 refines initial rankings based on additional criteria, such as metadata or temporal relevance, for improved document prioritization.

User Feedback Collector 324 gathers feedback from users on the relevance of retrieved documents, enhancing dataset quality for future retraining.

Feedback Processor 325 integrates user feedback into the labeled dataset, allowing the system to adapt dynamically to evolving user expectations.

Periodic Retraining Scheduler 326 automates retraining of the logistic regression model with updated data to maintain performance over time.

System Monitoring Dashboard 327 provides real-time metrics on system performance, identifying issues such as model drift or latency spikes for corrective action.

Query Embedding Cache 328 stores previously computed query embeddings to avoid redundant computations and improve response times for frequent queries.

Document Embedding Cache 329 retains document embeddings in memory for rapid access during relevance scoring and ranking processes.

Scalability Manager 330 ensures the system can handle high query volumes and large document repositories, maintaining efficiency and accuracy during peak operations.

Some embodiments provide a computerized method for enhancing document retrieval in Retrieval-Augmented Generation (RAG) systems by utilizing a supervised logistic regression model to optimize relevance scoring. The method begins with collecting and preprocessing historical data from the RAG system, consisting of user queries and corresponding retrieved documents. The data is structured into query-document pairs, which are labeled with binary relevance indicators (e.g., relevant or irrelevant) using predefined criteria. Labeling may be achieved through automated methods leveraging large language models (LLMs), manual human annotation, or user feedback collected during normal system operations. The labeled dataset is sampled using techniques like stratified sampling to create a representative subset, ensuring a balance of relevant and irrelevant examples. Queries and documents are encoded into numerical embedding vectors using a pre-trained embedding model, such as BERT or ROBERTa, which ensures consistent and contextually rich representations. Feature vectors are then generated by performing element-wise multiplication of corresponding components from query and document embeddings, capturing their interactive relationships. These feature vectors are organized into a structured dataset that is split into training and validation subsets.

The logistic regression model is trained on the labeled feature vectors to predict the probability of relevance for query-document pairs. During training, the model learns optimal weights for each embedding component, capturing their varying contributions to determining relevance. The training process incorporates techniques such as regularization (e.g., L1 or L2) to prevent overfitting and improve model generalization. Hyperparameter tuning is performed, using grid search or randomized search, to refine model configurations and achieve optimal performance. Validation data is used to assess the model's predictive accuracy and ensure robust generalization to unseen queries. Performance metrics such as accuracy, precision, recall, F1-score, and Area Under the Receiver Operating Characteristic Curve (AUC-ROC) are computed to evaluate the model's effectiveness.

Once trained, the logistic regression model is integrated into the RAG system to compute relevance scores for new query-document pairs. For each user query, the system generates a query embedding and computes feature vectors by performing element-wise multiplication with the pre-computed document embeddings. The trained logistic regression model calculates the relevance scores for each pair, representing the probability that the document is relevant to the query. The documents are then ranked in descending order of their relevance scores. The top-ranked documents, based on a predefined threshold or the top-K criterion, are selected for use by the RAG system. These selected documents are provided as input to a generative model, which produces responses tailored to the user query.

Some embodiments may further incorporate mechanisms for improving efficiency and scalability. A low-latency scoring engine is implemented to parallelize computations during relevance scoring and document ranking, enabling rapid responses to user queries. The system is designed to handle high query volumes and large document repositories, ensuring robust performance in practical deployments. Periodic retraining of the logistic regression model is scheduled to adapt to evolving user behavior and document content. Updated data is incorporated into the labeled dataset, and the retraining process ensures the system maintains its relevance prediction accuracy over time.

Additional components support enhanced system functionality. A re-ranker module refines initial rankings based on metadata or temporal relevance criteria. Query and document embedding caches store frequently accessed embeddings, reducing redundant computations and improving response times. User feedback is continuously collected through mechanisms such as thumbs-up/down indicators or explicit relevance ratings, and this feedback is integrated into the labeled dataset for dynamic system adaptation. A system monitoring dashboard provides real-time performance metrics, identifying potential issues such as model drift or latency spikes, which can be addressed to maintain system reliability.

The method avoids the limitations of traditional weight-agnostic cosine similarity algorithms, which assume equal importance for all embedding components, and does not rely on computationally intensive or data-hungry gradient-boosting models like RankNet or LambdaMART. Instead, it uses a straightforward yet effective logistic regression model to directly learn and apply weights to embedding features. The invention also avoids methods like Singular Value Decomposition (SVD) or Latent Semantic Indexing (LSI), focusing instead on element-wise feature interactions and a probabilistic approach to relevance scoring. The system's integration of feature engineering, supervised learning, and real-time ranking enables it to enhance the performance of RAG systems without introducing unnecessary complexity.

Some embodiments provide a robust framework for improving document retrieval accuracy in RAG systems. The method supports applications in various domains, including data security, compliance, threat detection, and decision-making, where precise and relevant information retrieval is essential.

Some embodiments may optionally incorporate a Feedback Loop mechanism to dynamically enhance the logistic regression model over time, based on real-world user interactions and relevance assessments. The feedback loop begins with the collection of user feedback from the Retrieval-Augmented Generation (RAG) system's responses to user queries. When a user submits a query, the system retrieves and ranks documents based on their relevance scores, generating a response through a generative artificial intelligence model. The system then provides the user with an interface to assess the quality and relevance of the response. This interface may include options such as thumbs-up/thumbs-down buttons, numerical ratings, or categorical labels (e.g., "helpful" or "not helpful"). Alternatively, implicit feedback mechanisms, such as user engagement metrics (e.g., time spent reading a document, clicking on a link, or requesting additional details), may be captured and interpreted as indirect indicators of relevance.

The collected feedback is processed and stored in a feedback repository, which serves as a continuously updating database of relevance assessments. For explicit feedback, such as thumbs-up/thumbs-down or ratings, the system directly associates the user's assessment with the corresponding query-document pair. For implicit feedback, the system applies predefined heuristics or machine learning models to infer relevance from behavioral data. For example, a document clicked on and viewed for an extended period may be inferred as relevant, while a document quickly dismissed may be inferred as irrelevant. To enhance reliability, the system may combine explicit and implicit feedback where available, assigning confidence scores to each feedback instance based on its source and context.

Once the feedback is stored, the system initiates a preprocessing step to prepare it for integration into the training dataset. This preprocessing step includes deduplication of feedback entries, normalization of feedback formats, and filtering of noisy or ambiguous feedback that may arise from inconsistent user inputs. The system applies criteria, such as a minimum confidence threshold, to discard feedback with low reliability. Feedback entries passing this filtering stage are then converted into labeled query-document pairs, with relevance indicators (e.g., binary labels of 1 for relevant and 0 for irrelevant) assigned based on user-provided or inferred assessments.

The labeled feedback entries are appended to the existing training dataset, creating an augmented dataset that reflects the evolving behavior and expectations of users. To ensure balanced representation, the system applies resampling techniques, such as over-sampling or under-sampling, to address any imbalances between relevant and irrelevant pairs introduced by the feedback data. Additionally, the system may perform clustering or stratification to maintain diversity within the augmented dataset, ensuring that it accurately represents the full range of query types and document content encountered in practice.

The feedback loop also includes a periodic retraining process to update the logistic regression model using the augmented dataset. This retraining process is initiated at regular intervals or triggered dynamically based on predefined conditions, such as a significant volume of new feedback data or a detected decline in system performance metrics. The retraining process follows the same steps as the initial training phase, including data splitting into training and validation subsets, feature engineering through element-wise multiplication of embeddings, and application of regularization techniques (e.g., L1 or L2) to prevent overfitting. During retraining, the system places greater emphasis on feedback entries by assigning them higher weights in the training process, ensuring that the model adapts effectively to the most recent user assessments.

Following retraining, the updated logistic regression model is evaluated on the validation subset of the augmented dataset. Performance metrics, such as precision, recall, F1-score, and AUC-ROC, are computed to assess the model's ability to generalize to unseen data. If the updated model meets predefined performance thresholds, it is deployed to replace the existing model within the RAG system. In cases where the updated model fails to meet these thresholds, the system may initiate additional data preprocessing steps, modify hyperparameters, or conduct further data collection to address deficiencies before redeploying the updated model.

To complete the feedback loop, the system continuously monitors the performance of the updated logistic regression model through a combination of real-time metrics and periodic evaluations. Metrics such as relevance score distributions, ranking quality, and user satisfaction indicators are analyzed to detect potential issues, such as model drift or performance degradation over time. If anomalies are detected, the system adjusts its retraining schedule or fine-tunes specific components of the feedback mechanism to address the underlying causes.

The feedback loop also supports adaptive improvements to other system components beyond the logistic regression model. For example, insights from user feedback can guide the refinement of relevance criteria, feature engineering strategies, or embedding models. The system may identify patterns in user behavior or preferences that suggest the inclusion of additional features, such as metadata or temporal relevance, in the feature vectors. Similarly, feedback data may inform the selection or fine-tuning of the pretrained embedding model, ensuring that it remains aligned with user expectations and content characteristics.

To ensure scalability and efficiency, the feedback loop incorporates mechanisms for parallel processing and distributed data handling. Feedback collection, preprocessing, and integration are designed to operate asynchronously, minimizing latency and ensuring that the RAG system remains responsive to user queries during ongoing updates. Additionally, the system employs storage and retrieval optimizations, such as caching frequently accessed feedback entries, to support real-time operations and reduce computational overhead.

By continuously integrating user feedback into the training process and updating the logistic regression model, the feedback loop enables the system to adapt dynamically to evolving user needs and content environments. This mechanism ensures that the RAG system maintains high relevance prediction accuracy and provides consistent, high-quality responses tailored to user queries.

Some embodiments may optionally use one or more of the following additional yet optional features. (a) Adaptive Query Expansion, as the system can be configured or modified to automatically suggest alternative or expanded queries based on the user's input, leveraging semantic relationships in embeddings to refine search results and address ambiguity in user intent. (b) Dynamic Weight Adjustment, as the system can be configured to support real-time or near-real-time recalibration of embedding component weights during scoring based on contextual query metadata, such as user location, time, or historical preferences. (c) Topic Drift Detection, as the system can be configured to identify and manage queries that deviate significantly from previously handled topics, using clustering and anomaly detection on embeddings to ensure appropriate response generation. (d) Confidence Scoring with Uncertainty Metrics, as the system can be configured to provide a confidence score and uncertainty range for each relevance prediction, helping users gauge the reliability of retrieved documents. (e) Incremental Learning Module, as the system can update the logistic regression model incrementally with new feedback data without requiring full retraining, ensuring faster adaptation to evolving user behavior. (f) Interactive Feedback Interface, as the system can allow users to highlight specific sections of documents they find relevant, enabling granular feedback that can refine query-document pair labeling. (g) Document Summarization Integration, as the system can further be configured to generate (using an LLM) and provide concise summaries of retrieved documents using generative AI, reducing user effort in determining document relevance and enhancing decision-making efficiency.

Some embodiments may reduce, mitigate, cure and/or prevent the following problems or some of them. (a) Irrelevant Document Retrieval, as the system reduces the retrieval of documents that fail to address user queries by optimizing relevance scoring based on learned embedding component weights. (b) Equal Weight Assumption Issues, as the system prevents inaccurate scoring caused by assuming all embedding components equally contribute to relevance, by dynamically assigning weights to features based on training data. (c) Sub-optimal Query Responses, as the system mitigates the generation of unsatisfactory query responses by ranking documents more accurately and selecting the most relevant ones for input to generative models. (d) Excessive User Effort, as the system reduces user effort required to sift through irrelevant documents by providing better-ranked and contextually appropriate responses. (e) Model Drift, as the system prevents degradation of relevance predictions over time through periodic re-training of the Logistic Regression model with updated feedback and data. (f) Dataset Imbalance, as the system can address imbalanced training datasets by applying sampling techniques to ensure diverse and balanced representation of relevant and irrelevant pairs. (g) Complexity of Ranking Algorithms, as the system can obviate the need for computationally intensive gradient-boosting ranking algorithms by using a straightforward logistic regression model for embedding-based relevance prediction. (h) Dynamic Content Challenges, as the system can be configured to adapt to evolving document repositories and user behavior, ensuring the system remains effective in retrieving relevant information despite changes. (i) Latency in Response Times, as the system can mitigate delays in query processing by implementing low-latency scoring engines and caching mechanisms for embeddings and relevance scores. (j) Inconsistent Feedback Utilization, as the system can prevent wasted opportunities for improvement by systematically collecting, processing, and integrating user feedback into the training and re-training processes.

Some embodiments may provide some, or all, of the following advantages or benefits. (a) Improved Relevance Accuracy, as the system provides more accurate document retrieval by leveraging supervised learning to assign optimal weights to embedding components, ensuring that retrieved documents align closely with the user's intent and query context. (b) Dynamic Adaptability, as the system can be configured to adapt to evolving user behavior and content changes through periodic model retraining, ensuring sustained relevance prediction accuracy and performance over time. (c) Reduced Computational Complexity, as the system can simplify ranking processes by using logistic regression instead of resource-intensive algorithms like gradient boosting, balancing performance with computational efficiency. (d) Enhanced User Satisfaction, by delivering highly relevant documents and reducing the need for users to sift through irrelevant results. (e) Scalable Architecture, as the system can support high query volumes and large document repositories through efficient processing mechanisms, enabling reliable performance in enterprise-level and large-scale deployments. (f) Feedback-Driven Improvements, as the system can continuously improve its accuracy by integrating explicit and implicit user feedback into training data, creating a dynamic feedback loop for ongoing optimization. (g) Efficient Feature Engineering, as the system can capture complex interactions between queries and documents using element-wise embedding multiplication, enabling detailed relevance assessment without extensive feature engineering efforts. (h) Customizable to Domains, as the system can be fine-tuned for domain-specific applications, such as legal, medical, or financial information retrieval, by adapting the embedding model and relevance criteria. (i) Real-Time Response Capability, as the system can provide rapid responses to user queries through low-latency scoring engines, improving user experience in time-sensitive scenarios.

Some embodiments provide a computerized method, comprising: (a) collecting historical query-document data from past interactions of users with a Retrieval-Augmented Generation (RAG) system in which the RAG system retrieved documents in response to user queries; (b) defining relevance criteria that determine whether or not a particular document that was retrieved by the RAG system is relevant to a particular query that was posed to the RAG system; (c) labeling query-document pairs with a binary relevance indicator of either Relevant or Irrelevant; (d) encoding queries and documents into numerical embedding vectors using a pre-trained embedding model; (e) generating feature vectors by performing element-wise multiplication of corresponding components of query embeddings and document embeddings; (f) organizing the feature vectors into a structured dataset; and splitting the structured dataset into (I) a training subset of feature vectors and (II) a validation subset of feature vectors; (g) training a logistic regression Machine Learning (ML) model using the training subset to predict the relevance of query-document pairs, and validating the logistic regression ML model using the validation subset; (h) integrating the trained logistic regression ML model into said RAG system for real-time relevance scoring of documents that the RAG system retrieves in response to new user queries.

In some embodiments, the method comprises: for an incoming user query, (A) computing query embeddings using said pre-trained embedding model of step (d); (B) generating feature vectors for candidate query-document pairs, by multiplying the query embedding of said incoming user query with precomputed document embeddings; (C) using the trained logistic regression ML model to compute relevance scores for each query-document pair based on respective feature vectors of each query-document pair; (D) ranking documents in descending order of computed relevance scores that were computed using the trained logistic regression ML model.

In some embodiments, the method comprises: (E) selecting the top K ranked documents from step (D), based on predefined threshold values or criteria; and providing the top K ranked documents as output of the RAG system.

In some embodiments, the method comprises: (E) selecting the top K ranked documents from step (D), based on predefined threshold values or criteria; and providing the top K ranked documents as input to a Generative Artificial Intelligence (Generative AI) tool that generates a contextually-relevant response to said incoming user query.

In some embodiments, the method comprises: obtaining user feedback that indicates quality level of the contextually-relevant response that was generated by the Generative AI tool in response to said incoming user query; utilizing said user feedback to re-train or fine-tune the logistic regression ML model.

In some embodiments, the method comprises: obtaining user feedback that indicates quality level of the contextually-relevant response that was generated by the Generative AI tool in response to said incoming user query; utilizing said user feedback to improve subsequent labeling of query-document pairs that are used for re-training the logistic regression ML model.

In some embodiments, the method comprises: pre-processing collected data by normalizing text, removing noise, and ensuring consistent formatting of user queries and retrieved documents.

In some embodiments, the method comprises: labeling query-document pairs with said binary relevance indicator of either Relevant or Irrelevant, by commanding a Large Language Model (LLM) (i) to evaluate each query and each respective document in each query-document pair and (ii) to estimate whether the document is relevant or irrelevant to answering a question that was posed in the query by taking into account context and estimated user intent.

In some embodiments, the method comprises: labeling query-document pairs with said binary relevance indicator of either Relevant or Irrelevant, based on manual annotation from human annotators that review each query-document pair.

In some embodiments, the method comprises: validating a dataset of labeled query-document pairs to ensure consistency, completeness, and alignment with defined relevance criteria.

In some embodiments, the method comprises: sampling the dataset of labeled query-document pairs using a stratified sampling technique to create a representative subset of dataset of labeled query-document pairs that would be utilized for model training and model validation.

In some embodiments, the method comprises: incorporating metadata into the feature vectors to enhance feature representation.

In some embodiments, the method comprises: applying a regularization technique during the training of the logistic regression ML model to prevent over-fitting and to improve generalization.

In some embodiments, the method comprises: tuning one or more hyper-parameters, including at least regularization strength, using grid search or randomized search to improve performance of the logistic regression ML model.

In some embodiments, step (g) further comprises: evaluating qualities of the logistic regression ML model using validation data and accuracy metrics that include at least: precision, recall, F1-score, AUC-ROC.

In some embodiments, step (g) further comprises: periodically re-training or periodically fine-tuning the logistic regression ML model based on feedback from users that indicate user satisfaction from quality of AI-generated responses that were provided to users in response to user queries using the RAG system that utilizes the logistic regression ML model.

In some embodiments, the method comprises: integrating the logistic regression ML model and the RAG system to be operably associated and communicatively associated with a data-lake or data-silo of organizational documents and with an LLM-based chat-bot that generates responses to user queries.

In some embodiments, the computerized method ranks documents by utilizing a Cosine Similarity algorithm that uses numerical embedding vectors that are weighted, instead of utilizing a weight-agnostic Cosine Similarity algorithm; wherein the method ranks documents without utilizing: Supervised Semantic Indexing (SSI) based ranking, Latent Semantic Indexing (LSI) based ranking, Singular Value Decomposition (SVD) based ranking, a gradient-boosting model based ranking.

Some embodiments provide a system comprising: one or more hardware processors, that are configured to execute code, and that are operably associated with one or more memory units; wherein the one or more hardware processors are configured to perform a method as described.

Some embodiments provide a non-transitory storage medium having stored thereon instructions that, when executed by a machine, cause the machine to perform a method as described.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments may be implemented by using hardware units, software units, processors, CPUs, DSPs, GPUs, integrated circuits (ICs), memory units, storage units, wireless communication modems or transmitters or receivers or transceivers, cellular transceivers, a power source, input units, output units, Operating System (OS), drivers, applications, and/or other suitable components.

Some embodiments may be implemented by using a special-purpose machine or a specific-purpose that is not a generic computer, or by using a non-generic computer or a non-general computer or machine. Such system or device may utilize or may comprise one or more units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented by using code or program code or machine-readable instructions or machine-readable code, which is stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such device to perform a method in accordance with the present invention.

Some embodiments may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) or Virtual Reality (VR) or Mixed Reality (XR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

The system(s) and/or device(s) of some embodiments may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of some embodiments may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with some embodiments, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit, a Flash drive), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), BASIC, Visual BASIC, MATLAB, Pascal, HTML, HTML5, CSS, Dart, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results (e.g., within a pre-defined threshold level of similarity; such as, within 5 percent above or below a pre-defined threshold value), among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may comprise any possible combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some embodiments have been illustrated and described herein, many modifications, substitutions, changes, and equivalents may occur to those skilled in the art. Accordingly, the claims are intended to cover all such modifications, substitutions, changes, and equivalents.

What is claimed is:

1. A computerized method, comprising:

(a) collecting historical query-document data from past interactions of users with a Retrieval-Augmented Generation (RAG) system in which the RAG system retrieved documents in response to user queries;

(b) defining relevance criteria that determine whether or not a particular document that was retrieved by the RAG system is relevant to a particular query that was posed to the RAG system, by performing at least one of:

(b1) defining rules that indicate what constitutes relevance between a query and a document, wherein the relevance criteria comprise at least one of: topic alignment, information completeness, user intent, and context;

(b2) defining a rule that indicates that a document is determined to be relevant to a query if the document provides relevant information to answer a question that was posed in the query;

(b3) establishing relevance-assessment rules and providing prompts to a Large Language Model (LLM), instructing the LLM to assess relevance of documents to queries via an LLM-based analysis that determines whether or not a document provides relevant information to answer a query or provides a correct and useful answer to the query;

(b4) defining relevance assessments based on user feedback regarding documents presented in response to user queries, by utilizing (i) explicit user feedback and (ii) implicit user feedback inferred from behavioral data using predefined heuristics or machine learning models;

(b5) inferring relevance of a document to a query from behavioral data, using predefined heuristics or machine learning models; wherein a document that was clicked on and reviewed by a human user is inferred as relevant to the query, and wherein a document that was dismissed by a human user is inferred as irrelevant to the query;

(c) labeling query-document pairs with a binary relevance indicator of either Relevant or Irrelevant;

(d) encoding queries and documents into numerical embedding vectors using a pre-trained embedding model;

(e) generating feature vectors by performing element-wise multiplication of corresponding components of query embeddings and document embeddings;

(f) organizing the feature vectors into a structured dataset; and splitting the structured dataset into (I) a training subset of feature vectors and (II) a validation subset of feature vectors;

(g) training a logistic regression Machine Learning (ML) model using the training subset to predict the relevance of query-document pairs, and validating the logistic regression ML model using the validation subset;

(h) integrating the trained logistic regression ML model into said RAG system for real-time relevance scoring of documents that the RAG system retrieves in response to new user queries.

2. The computerized method of claim 1, further comprising:

for an incoming user query, (A) computing query embeddings using said pre-trained embedding model of step (d);

(B) generating feature vectors for candidate query-document pairs, by multiplying the query embedding of said incoming user query with precomputed document embeddings;

(C) using the trained logistic regression ML model to compute relevance scores for each query-document pair based on respective feature vectors of each query-document pair;

(D) ranking documents in descending order of computed relevance scores that were computed using the trained logistic regression ML model.

3. The computerized method of claim 2, further comprising:

(E) selecting the top K ranked documents from step (D), based on predefined threshold values or criteria; and providing the top K ranked documents as output of the RAG system.

4. The computerized method of claim 2, further comprising:

(E) selecting the top K ranked documents from step (D), based on predefined threshold values or criteria; and providing the top K ranked documents as input to a Generative Artificial Intelligence (Generative AI) tool that generates a contextually-relevant response to said incoming user query.

5. The computerized method of claim 4, further comprising:

obtaining user feedback that indicates quality level of the contextually-relevant response that was generated by the Generative AI tool in response to said incoming user query;

utilizing said user feedback to re-train or fine-tune the logistic regression ML model.

6. The computerized method of claim 4, further comprising:

obtaining user feedback that indicates quality level of the contextually-relevant response that was generated by the Generative AI tool in response to said incoming user query;

utilizing said user feedback to improve subsequent labeling of query-document pairs that are used for re-training the logistic regression ML model.

7. The computerized method of claim 1, wherein step (a) further comprises:

pre-processing collected data by normalizing text, removing noise, and ensuring consistent formatting of user queries and retrieved documents.

8. The computerized method of claim 1, wherein step (c) comprises:

labeling query-document pairs with said binary relevance indicator of either Relevant or Irrelevant, by commanding a Large Language Model (LLM) (i) to evaluate each query and each respective document in each query-document pair and (ii) to estimate whether the document is relevant or irrelevant to answering a question that was posed in the query by taking into account context and estimated user intent.

9. The computerized method of claim 1, wherein step (c) comprises:

labeling query-document pairs with said binary relevance indicator of either Relevant or Irrelevant, based on manual annotation from human annotators that review each query-document pair.

10. The computerized method of claim 1, wherein step (c) further comprises:

validating a dataset of labeled query-document pairs to ensure consistency, completeness, and alignment with defined relevance criteria.

11. The computerized method of claim 1, wherein step (c) further comprises:

sampling the dataset of labeled query-document pairs using a stratified sampling technique to create a representative subset of dataset of labeled query-document pairs that would be utilized for model training and model validation.

12. The computerized method of claim 1, wherein step (e) further comprises:

incorporating metadata into the feature vectors to enhance feature representation.

13. The computerized method of claim 1, wherein step (g) further comprises:

applying a regularization technique during the training of the logistic regression ML model to prevent over-fitting and to improve generalization.

14. The computerized method of claim 1, wherein step (g) further comprises:

tuning one or more hyper-parameters, including at least regularization strength, using grid search or randomized search to improve performance of the logistic regression ML model.

15. The computerized method of claim 1, wherein step (g) further comprises:

evaluating qualities of the logistic regression ML model using validation data and accuracy metrics that include at least: precision, recall, F1-score, AUC-ROC.

16. The computerized method of claim 1, wherein step (g) further comprises:

periodically re-training or periodically fine-tuning the logistic regression ML model based on feedback from users that indicate user satisfaction from quality of AI-generated responses that were provided to users in response to user queries using the RAG system that utilizes the logistic regression ML model.

17. The computerized method of claim 1, further comprising:

integrating the logistic regression ML model and the RAG system to be operably associated and communicatively associated with a data-lake or data-silo of organizational documents and with an LLM-based chat-bot that generates responses to user queries.

18. The computerized method of claim 1, wherein the computerized method ranks documents by utilizing a Cosine Similarity algorithm that uses numerical embedding vectors that are weighted, instead of utilizing a weight-agnostic Cosine Similarity algorithm;

wherein the method ranks documents without utilizing: Supervised Semantic Indexing (SSI) based ranking, Latent Semantic Indexing (LSI) based ranking, Singular Value Decomposition (SVD) based ranking, a gradient-boosting model based ranking.

19. A system comprising:

one or more hardware processors, that are configured to execute code, and that are operably associated with one or more memory units;

wherein the one or more hardware processors are configured to perform a computerized process comprising:

(a) collecting historical query-document data from past interactions of users with a Retrieval-Augmented Generation (RAG) system in which the RAG system retrieved documents in response to user queries;

(b) defining relevance criteria that determine whether or not a particular document that was retrieved by the RAG system is relevant to a particular query that was posed to the RAG system, by performing at least one of:

(b1) defining rules that indicate what constitutes relevance between a query and a document, wherein the relevance criteria comprise at least one of: topic alignment, information completeness, user intent, and context;

(b2) defining a rule that indicates that a document is determined to be relevant to a query if the document provides relevant information to answer a question that was posed in the query;

(b3) establishing relevance-assessment rules and providing prompts to a Large Language Model (LLM), instructing the LLM to assess relevance of documents to queries via an LLM-based analysis that determines whether or not a document provides relevant information to answer a query or provides a correct and useful answer to the query;

(b4) defining relevance assessments based on user feedback regarding documents presented in response to user queries, by utilizing (i) explicit user feedback and (ii) implicit user feedback inferred from behavioral data using predefined heuristics or machine learning models;

(b5) inferring relevance of a document to a query from behavioral data, using predefined heuristics or machine learning models; wherein a document that was clicked on and reviewed by a human user is inferred as relevant to the query, and wherein a document that was dismissed by a human user is inferred as irrelevant to the query;

(c) labeling query-document pairs with a binary relevance indicator of either Relevant or Irrelevant;

(d) encoding queries and documents into numerical embedding vectors using a pre-trained embedding model;

(e) generating feature vectors by performing element-wise multiplication of corresponding components of query embeddings and document embeddings;

(f) organizing the feature vectors into a structured dataset; and splitting the structured dataset into (I) a training subset of feature vectors and (II) a validation subset of feature vectors;

(g) training a logistic regression Machine Learning (ML) model using the training subset to predict the relevance of query-document pairs, and validating the logistic regression ML model using the validation subset;

(h) integrating the trained logistic regression ML model into said RAG system for real-time relevance scoring of documents that the RAG system retrieves in response to new user queries.

20. A non-transitory storage medium having stored thereon instructions that, when executed by a machine, cause the machine to perform a computerized process comprising:

(a) collecting historical query-document data from past interactions of users with a Retrieval-Augmented Generation (RAG) system in which the RAG system retrieved documents in response to user queries;

(b) defining relevance criteria that determine whether or not a particular document that was retrieved by the RAG system is relevant to a particular query that was posed to the RAG system, by performing at least one of:

(b1) defining rules that indicate what constitutes relevance between a query and a document, wherein the relevance criteria comprise at least one of: topic alignment, information completeness, user intent, and context;

(b2) defining a rule that indicates that a document is determined to be relevant to a query if the document provides relevant information to answer a question that was posed in the query;

(b3) establishing relevance-assessment rules and providing prompts to a Large Language Model (LLM), instructing the LLM to assess relevance of documents to queries via an LLM-based analysis that determines whether or not a document provides relevant information to answer a query or provides a correct and useful answer to the query;

(b4) defining relevance assessments based on user feedback regarding documents presented in response to user queries, by utilizing (i) explicit user feedback and (ii) implicit user feedback inferred from behavioral data using predefined heuristics or machine learning models;

(b5) inferring relevance of a document to a query from behavioral data, using predefined heuristics or machine learning models; wherein a document that was clicked on and reviewed by a human user is inferred as relevant to the query, and wherein a document that was dismissed by a human user is inferred as irrelevant to the query;

(c) labeling query-document pairs with a binary relevance indicator of either Relevant or Irrelevant;

(d) encoding queries and documents into numerical embedding vectors using a pre-trained embedding model;

(e) generating feature vectors by performing element-wise multiplication of corresponding components of query embeddings and document embeddings;

(f) organizing the feature vectors into a structured dataset; and splitting the structured dataset into (I) a training subset of feature vectors and (II) a validation subset of feature vectors;

(g) training a logistic regression Machine Learning (ML) model using the training subset to predict the relevance of query-document pairs, and validating the logistic regression ML model using the validation subset;

(h) integrating the trained logistic regression ML model into said RAG system for real-time relevance scoring of documents that the RAG system retrieves in response to new user queries.

\* \* \* \* \*